(12) United States Patent
Morris et al.

(10) Patent No.: US 10,409,381 B2
(45) Date of Patent: *Sep. 10, 2019

(54) GESTURES, INTERACTIONS, AND COMMON GROUND IN A SURFACE COMPUTING ENVIRONMENT

(71) Applicant: Microsoft Technology Licensing, LLC, Redmond, WA (US)

(72) Inventors: Meredith June Morris, Bellevue, WA (US); Eric J. Horvitz, Kirkland, WA (US); Andrew David Wilson, Seattle, WA (US); F. David Jones, Bellevue, WA (US); Stephen E. Hodges, Cambridge (GB); Kenneth P. Hinckley, Redmond, WA (US); David Alexander Butler, Cambridge (GB); Ian M. Sands, Seattle, WA (US); V. Kevin Russ, Bellevue, WA (US); Hrvoje Benko, Seattle, WA (US); Shawn R. LeProwse, Mercer Island, WA (US); Shahram Izadi, Cambridge (GB); William Ben Kunz, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 702 days.

This patent is subject to a terminal disclaimer.

(21) Appl. No.: 14/822,456

(22) Filed: Aug. 10, 2015

(65) Prior Publication Data

US 2015/0346837 A1 Dec. 3, 2015

Related U.S. Application Data

(63) Continuation of application No. 12/335,301, filed on Dec. 15, 2008, now Pat. No. 9,134,798.

(51) Int. Cl.
*G06F 3/01* (2006.01)
*H04L 29/06* (2006.01)

(52) U.S. Cl.
CPC ............ *G06F 3/017* (2013.01); *H04L 67/42* (2013.01)

(58) Field of Classification Search
CPC ....... G06F 3/017; H04L 67/42; G09G 3/3648; G09G 3/3614; G09G 2300/0426;
(Continued)

(56) References Cited

U.S. PATENT DOCUMENTS 6,963,937 B1 * 11/2005 Kamper ............... G06F 3/038
345/156
7,042,442 B1 5/2006 Kanevsky et al.
(Continued)

OTHER PUBLICATIONS

"Final Office Action issued in U.S. Appl. No. 12/335,301", dated May 21, 2014 (18 Pages).
(Continued)

*Primary Examiner* — Sahlu Okebato
(74) *Attorney, Agent, or Firm* — Drinker Biddle & Reath LLP

(57) ABSTRACT

Aspects relate to detecting gestures that relate to a desired action, wherein the detected gestures are common across users and/or devices within a surface computing environment. Inferred intentions and goals based on context, history, affordances, and objects are employed to interpret gestures. Where there is uncertainty in intention of the gestures for a single device or across multiple devices, independent or coordinated communication of uncertainty or engagement of users through signaling and/or information gathering can occur.

19 Claims, 9 Drawing Sheets

(58) Field of Classification Search
CPC ... G09G 2310/0297; G09G 2320/0209; G09G 2320/0219; G09G 2320/0223; G09G 2320/0233

See application file for complete search history.

(56) References Cited

U.S. PATENT DOCUMENTS

| | | | |
|---|---|---|---|
| 7,225,414 B1 | 5/2007 | Sharma et al. | |
| 7,274,803 B1 | 9/2007 | Sharma et al. | |
| 7,844,921 B2 | 11/2010 | Ike et al. | |
| 2002/0075334 A1 | 6/2002 | Yfantis | |
| 2003/0103653 A1* | 6/2003 | Avni | G06F 21/32 382/119 |
| 2004/0179036 A1 | 9/2004 | Teplov et al. | |
| 2004/0193413 A1* | 9/2004 | Wilson | G06F 3/017 704/243 |
| 2005/0024346 A1 | 2/2005 | Dupraz et al. | |
| 2005/0212753 A1 | 9/2005 | Marvit et al. | |
| 2005/0212754 A1* | 9/2005 | Marvit | G06F 1/1626 345/156 |
| 2006/0010400 A1* | 1/2006 | Dehlin | G06F 3/0354 715/856 |
| 2006/0209021 A1 | 9/2006 | Yoo et al. | |
| 2007/0013716 A1 | 1/2007 | Kjeldsen et al. | |
| 2008/0040692 A1 | 2/2008 | Sunday et al. | |
| 2008/0168403 A1 | 7/2008 | Westerman et al. | |
| 2009/0150802 A1 | 6/2009 | Do et al. | |
| 2010/0149090 A1 | 6/2010 | Morris et al. | |
| 2011/0193727 A1* | 8/2011 | Goto | G06F 3/03547 341/20 |
| 2014/0033134 A1* | 1/2014 | Pimmel | H04L 67/1074 715/863 |

OTHER PUBLICATIONS

"Final Office Action issued in U.S. Appl. No. 12/335,301", dated Jan. 7, 2013 (9 Pages).

"Non Final Office Action issued in U.S. Appl. No. 12/335,301", dated Jul. 16, 2012 (10 Pages).

"Non Final Office Action issued in U.S. Appl. No. 12/335,301", dated Nov. 27, 2013, (18 Pages).

"Non Final Office Action issued in U.S. Appl. No. 12/335,301", dated Dec. 17, 2014, (19 Pages).

"Notice of Allowance issued in U.S. Appl. No. 12/335,301", dated May 14, 2015, (15 Pages).

Baudel, et al., "Charade: Remote Control of Objects using Free-Hand Gestures", <<http://citeseer.ist.psu.edu/cache/papers/cs/23045/http:zSzzSzwww.Iri.frzSz~thomaszSzDocszSzcharade93.pdf/baudel93charade.pdf>> Last accessed Aug. 29, 2008, 10 pages.

Long, Jr., et al. "Implications for a Gesture Design Tool", <<http://www-mash.cs.berkeley,edu/research/publications/1999/152/gdteval.pdf>> Last accessed Aug. 29, 2008, 8 pages.

Starner, et al., "The Gesture Pendant: A Self-illuminating, Wearable, Infrared Computer Vision System for Home Automation Control and Medical Monitoring", <<http://www.cc.gatech.edu/fac/Thad.Stamer/p/031_30_Gesture/gesture_pendantISWC2000.pdf>> Last accessed Aug. 29, 2008, 8 pages.

Vanacken, et al., "Ghosts in the Interface: Meta-user Interface Visualizations as Guides for Multi-touch Interaction" IEEE International Workshop on Horizontal Interactive Human Computer System. 2008. 4 pages.

Wu, et al., "Gesture Registration, Relaxation, and Reuse for Multi-Point Direct-Touch Surfaces", IEEE International Workshop on Horizontal Interactive Human-Computer Systems, Jan. 2006. pp. 183-190. TR2005-109, Oct. 2005 <<http://www.merl.com/reports/docs/TR2005-109.pdf>> Last accessed Aug. 29, 2008, 10 pages.

* cited by examiner

GESTURES, INTERACTIONS, AND COMMON GROUND IN A SURFACE COMPUTING ENVIRONMENT

CROSS-REFERENCE TO RELATED APPLICATION

This application is a continuation of, and claims priority to, co-pending, commonly owned, U.S. patent application Ser. No. 12/335,301 filed Dec. 15, 2008, and entitled "Gestures, Interactions, And Common Ground In a Surface Computing Environment," which is incorporated by reference herein in its entirety.

BACKGROUND

Computing devices (both wired and wireless) are utilized by a large number of people and in a variety of contexts (e.g., personal, social, professional, and so on). For example, it is common to see people communicating (e.g., telephone calls, text messages, emails, data transfer, and so forth) no matter where that person might be located (e.g., in a supermarket, in a library, taking public transportation, and so forth). As technology advances, so does the speed of communications and the demand for increased computing power. Based on the increased demands for computing capabilities, people are requiring more and more resources to be available for communicating electronically, whether the communication is with friends, family, coworkers, or others.

Computing technology has evolved such that touch screens and other devices (e.g., cameras) can track a user's movements and make intelligent decisions regarding those movements. It has also become more commonplace for users to share a single computing environment and work together and/or separately within that computing environment.

Since the demand for electronic computing devices is at an all time high, it is important to provide users with any time, anywhere computing capabilities. However, concerns can arise as it relates to interacting with various computing environments both on an individual basis and in a group setting.

SUMMARY

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

In accordance with one or more examples and corresponding disclosure thereof, various aspects are described in connection with a platform for creating and teaching gestures within a surface computing environment. In response to the user's gestures, feedback can be presented to the user irrespective of whether the gesture was understood and/or an action associated with the gesture will be implemented. Further, the various gestures can be distinguished from other gestures (e.g., hand movements while talking) in order to mitigate the implementation of incorrect actions as a function of a misunderstood gesture. Further, two or more users can be associated based on historical information, such as previous interactions. Additionally or alternatively, as two (or more) users are interacting in a surface computing environment, the users can be dynamically linked allowing for a collaborative type experience.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

DETAILED DESCRIPTION

Figure 1:
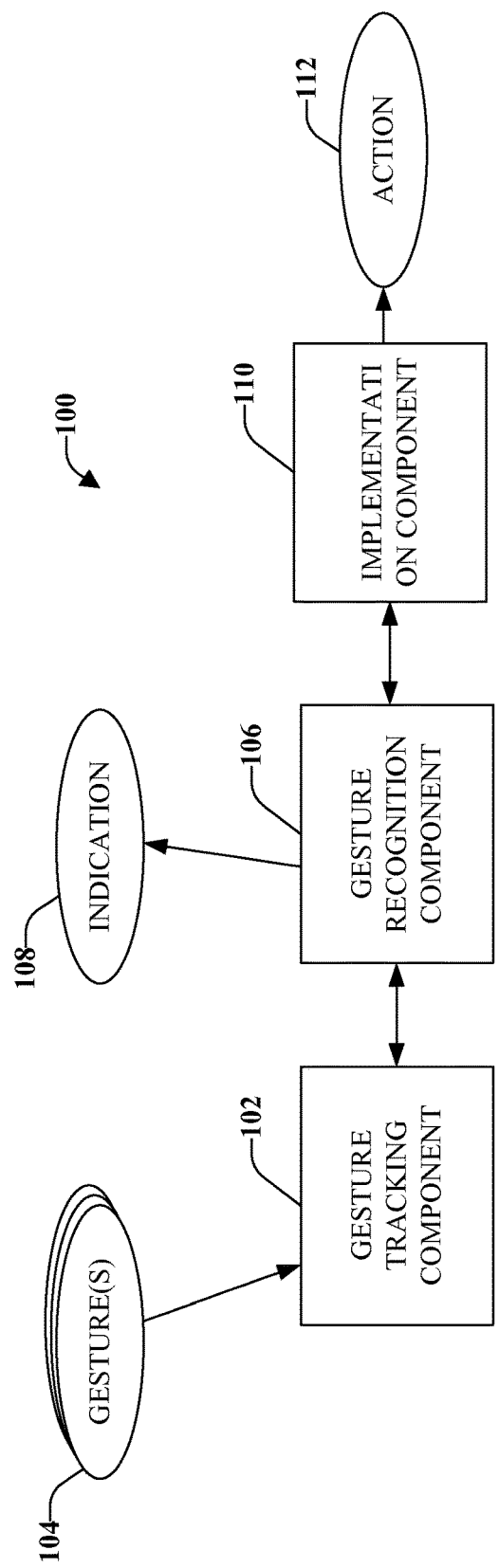
FIG. 1 illustrates a system for identifying a gesture in a surface computing environment and providing feedback related to that gesture.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Computing systems employing automated learning and reasoning procedures (e.g., the use of explicitly and/or implicitly trained statistical classifiers) can be employed in connection with performing inference and/or probabilistic determinations and/or statistical-based determinations as in accordance with one or more aspects as described hereinafter. As used herein, the term "inference" refers generally to the process of reasoning about or inferring states of the system, environment, and/or user from a set of observations as captured through events, sensors, and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, logic-centric production systems, Bayesian belief networks, fuzzy logic, data fusion engines, and so on) can be employed in connection with performing automatic and/or inferred action in connection with the disclosed aspects.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Additionally, in the subject description, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Referring initially to FIG. 1, illustrated is a system 100 for identifying a gesture in a surface computing environment and providing feedback related to the gesture. To implement surface based computing, keyboard, mouse, and other device interactions should be changed into gesture formats that are understandable to both the system 100 and the person creating or inputting the gesture. System 100 can provide a platform for creating and teaching gestures in a surface computing environment.

Included in system 100 is a gesture tracking component 102 that is configured to recognize at least one gesture 104. The gesture can be a hand motion, a hand and arm motion, or any other physical motion that can be perceived by system 100. A standard grammar for common gestures across multiple devices and types of applications is provided by gesture tracking component 102. The standard grammar can be based on a notion of taking all the gestures that can be communicated in a natural way among N devices in space, where N is an integer. Further, gesture tracking component 102 can include a set of predefined gestures that are easy for a user to perform and that are intuitive and natural.

The gestures can include universal gestures, which can be obvious and easy learn as well as advanced gestures that might require a user to perform multiple actions. In accordance with some aspects, the gesture is received at substantially the same time as another action, such as a verbal command, is received.

For example, computing shortcuts that are generally entered through interaction with a keyboard can be translated into a gesture. Such gestures can include a "cut-copy-and-paste" function, where, for example, a hand gesture drawing an "X" in the air could indicate a cut operation. A "C" drawn in the air with a hand gesture can indicate a copy operation and a "P" drawn in the air can indicate a paste operation. More advanced gestures can include a star for launching favorites. In another example, user controls can be implemented with gestures. For example, holding a hand up with the palm out can indicate a pause function (such as to pause a video playback). A short little line drawn with a finger to the right can indicate play and a longer line drawn with finger can indicate fast forward.

In another example, if the user desires to rotate a picture of a landscape or a rectangular device by twisting her hand, gesture tracking component 102 can understand that gesture based on an inference of what the user's intention most likely would be given the context and the gesture. In another example, a user can place two figures on a picture and expand those fingers outward (or inward) to make the picture appear larger (or smaller).

In accordance with some aspects, the gestures can be defined by the user through interaction with the system 100 over time (e.g., historical information). For example, the user might have gestures that are unique to him and he would like to use those gestures to interact with system 100. Thus, the user can directly specify (e.g., through a user interface, such as a keyboard, with verbal commands, and so forth) the action and then provide the gesture associated with that action. According to an aspect, the user can train gesture tracking component 102 through a training mode or learning phase. Further, the user can reinitiate the training mode at any time, such as if a new program has been learned and the user has specific gestures that he would like to utilize with that new program.

Additionally or alternatively, gestures commonly utilized by a user can be retained by personal devices (e.g., mobile devices) associated with each user. These personal devices can observe and store information about gestures typically utilized by the device user. Such information can be conveyed to system 100 to support per-user gestures and to assist the recognition of gestures by tracking component 102. Tracking component 102 can gather the information from each device such as by requesting the information, automatically receiving the information, and so forth. Based on the gathered information, tracking component 102 can distinguish a received gesture from other gestures, such as common gestures (e.g., a hand wave, using hands to emphasize a point being discussed, and so forth).

Also included in system 100 is a gesture recognition component 106 that is configured to provide an indication 108 that the at least one gesture 104 is recognized. The indication 108 is a type of feedback to the user and can be provided in various forms and/or can be conveyed when an automatic action is performed by system 100 (e.g., an action based on interpretation of the gesture is automatically performed). In accordance with some aspects, the indication 108 is communicated to the user by providing a representation of the gesture in the form of a virtual object (e.g., virtual hand) performing the action that is being requested. Further information related to this aspect will be provided with reference to FIG. 4 below.

According to some aspects, gesture recognition component 106 can provide a gesture trail that is visible in the surface computing environment. This gesture trail can be perceived by the user and is provided so the user can immediately visualize the gesture that was just drawn. For example, if the user draws in the air a star to indicate that Internet favorites should be launched, gesture recognition component 106 can provide a visual representation of that "star" in the surface computing environment. This feedback can provide some assurance to the user that the desired action was communicated to and received by system 100.

If the system 100 does not understand a gesture, or, more formally, either an inferred threshold on a degree of uncertainty or an expected cost of misunderstanding is exceeded, the system 100 can seek to request clarification, indicate uncertainty, or relay the status of understanding or a confirmation of its understanding of the gesture. Gesture recognition component 106 can engage the user and/or provide feedback to the user in the form of rendering visual and/or auditory highlights, prompts, graphics, or combinations thereof. For example, consider the case where two devices are to be joined together with gestures and there are more than two devices that the user might have indicated should be joined. Gesture recognition component 106 can request confirmation, such as by having the various devices produce a light (e.g., similar color, similar intensity), similar flashing pattern or a sound (e.g., similar tone, similar pitch, voice asking "Do you mean me?). The user can confirm which two devices should be joined such as by pointing to the devices or providing another indication (e.g., physically touching the devices, selecting from a list provided by gesture recognition component 106, and so forth). If there is uncertainty in intention of the gestures for a single device or across multiple devices, independent or coordinated communication of uncertainty or engagement of users through signaling and/or information gathering can by facilitated by gesture recognition component 106.

In accordance with some aspects, gesture recognition component 106 can provide feedback or an indication 108 even if the gesture had no impact on the system 100 (e.g., there was no action requested, no action will be performed, and so forth). For example, system 100 can be configured to not only realize to whom or to which unit (e.g., device) the gesture is intended and what that gesture might mean but also to understand that people can be gesturing at other people and/or can be gesturing while they are talking.

Additionally or alternatively, gesture recognition component 106 or another system component can solicit confirmation from the user before implementing an action 112. For example, there might be some question regarding whether the gesture was understood by gesture tracking component 102. The question can relate to an action that the user would like to perform (based on interpretation of the gesture), the object on which an action should be taken, and/or other information. For example, there might be two documents (document A and document B) on a surface display. A gesture can be received by the user that indicates that a document should be closed. However, system 100 is not sure whether the user would like document A closed or would like document B closed. System 100 can solicit further information from the user in order to close the correct document.

If there are questions related to an action that should be implemented or the item on which an action should be performed, system 100 can interact with the user. If there are gestures that system 100 is not sure about, system 100 can obtain gestures that are similar to the gesture provided and ask if that is what the user meant. According to some aspects, computations of the expected value of different forms of user input can be computed and these computations can drive interactions with users (e.g., affordances).

In accordance with some aspects, system 100 can employ gaze tracking to determine what a gesture is referring to (e.g., a device, a document, and so forth). Additionally or alternatively, gaze tracking can be utilized to determine person-to-person eye contact. Based on this person-to-person eye contact, system 100 can infer which users are talking to each other, which can also indicate the users that are working together.

Other techniques can also be utilized by system 100 to determine the meaning of one or more gestures. Such techniques can include a proximity to where the hand (or other item used to gesture) is, such that the closest device (or other item) is inferred to be the device on which an action should be performed (as instructed by the gesture). According to some aspects, the inference can be made based on a recent action (e.g., the last gesture referred to this picture, so the user must be referring to this picture now). In another example, a previous clarification request might have recently confirmed that it was a particular document to which the user was referring and, based on this clarification, system 100 can continue to use that document. According to another aspect, the inference can be made based on focus, such as the focus of human attention, focus of discussion, focus of interaction of session, and so on.

According to some aspects, the signaling and interaction methodology or modality for engaging users for more information about their intentions can be a function of the context. For example, in an office setting there might be people that are busy and/or would not like to be disturbed. In this situation, an employee (such as a new employee) can utilize a quiet visual model. In another example, it might be important to attract the attention of a user who is looking away from a visual display component of the system. If the user is in a setting where others will not be disturbed, an audio notification might be rendered.

An implementation component 110 is configured to automatically execute a requested action or to implement a requested action after receiving confirmation of the gesture by the user (e.g., in response to a prompt). In accordance with some aspects, implementation component 110 can be configured to automatically execute the requested action based on historical information related to this user and/or group of users. For example, if the user has established a gesture to indicate a particular action (e.g., through a learning phase or training mode) and consistently utilizes that gesture to have that action implemented, implementation component 110 can automatically determine that any time the user makes that particular gesture a certain action 112 should automatically be taken.

Figure 2:
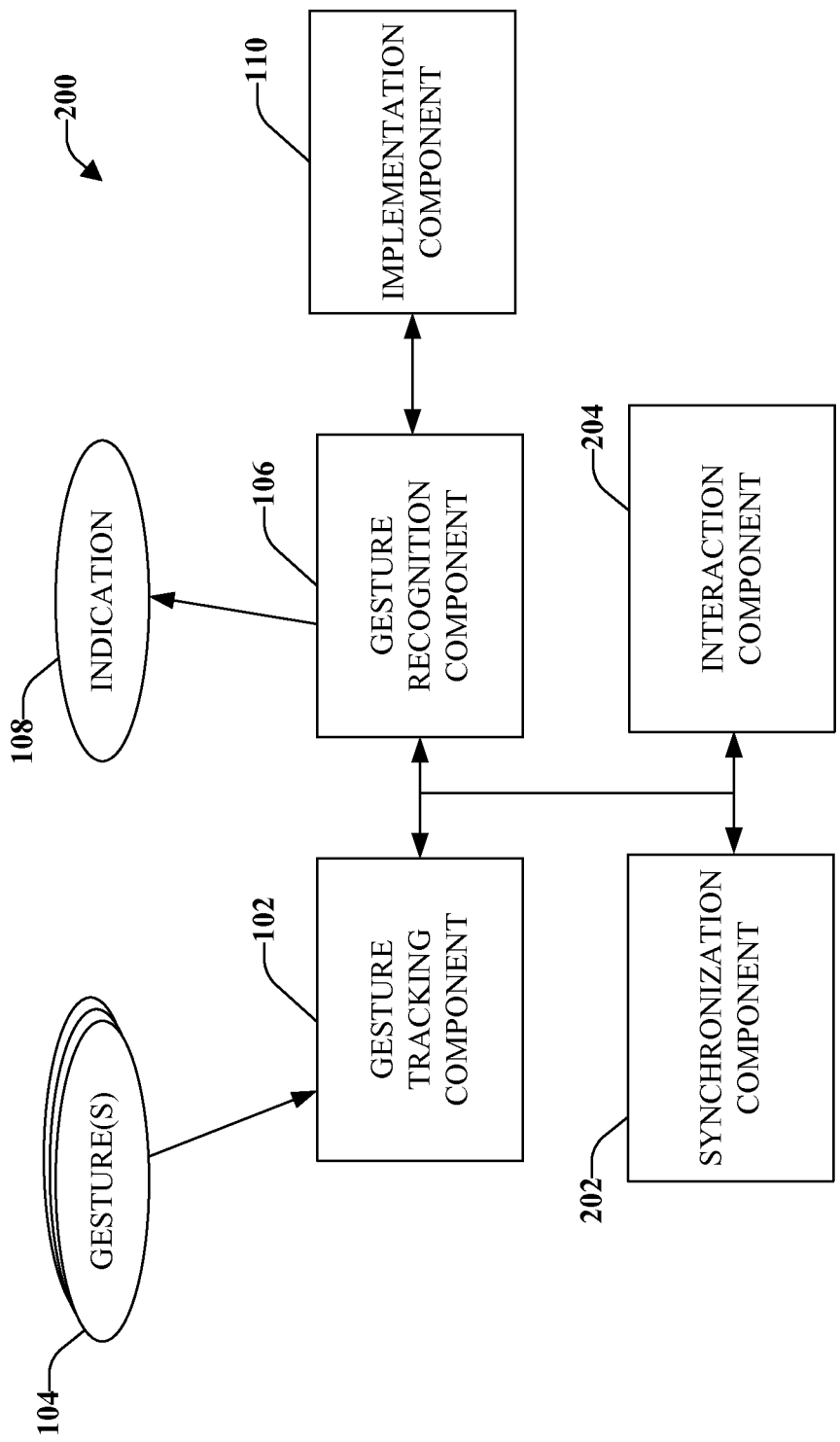
FIG. 2 illustrates a system for dynamically grouping or categorizing users as a function of a commonality among the users, according to an aspect.

FIG. 2 illustrates a system 200 for dynamically grouping or categorizing users as a function of a commonality among the users, according to an aspect. System includes a gesture tracking component 102 that is configured to receive one or more gestures 104 from one or more users. A gesture recognition component 106 can provide an indication 108 that the gesture was received and understood by system 200. The indication 108 can be in the form of feedback, such as a gesture trail, a visual representation of the gesture the user is performing (e.g., a virtual hand), as well as other forms of feedback. Based on the recognition of the gesture(s) 104, implementation component 110 is configured to automatically carry out action(s).

Also included in system 200 is a synchronization component 202 that is configured to dynamically group two or more users. For example, there can be multiple users at a surface table, such as eight users. Two of those users can be working on the same task and, based on the nature of their gestures, synchronization component 202 can determine that those users are sharing the common task. For example, both users might touch a part of the surface (e.g., a graph) and based on this action by both users, synchronization component 202 dynamically groups the users. In another example, synchronization component 202 can utilize gaze tracking techniques to determine that the two users are interacting.

Synchronization component 202 can provide a graphical representation to indicate that the users have been grouped, which can indicate that the users are working on the same tasks, are communicating with each other, and so forth. For example, the users can be represented on a surface display as objects (e.g., visual representation of a person), an avatar, by name, or in another format. A graphical representation can include a linkage between (e.g., a line connecting) the two or more user representations, highlighting both user representations with the same color, or through other means of indicating that the users are joined. According to some aspects, synchronization component 202 can provide a graphical representation in the form of highlighting the task(s) to indicate that the tasks are grouped. Further, synchronization component 202 can limit access to the common task to the users that are grouped and/or linked to that task.

Additionally or alternatively, synchronization component 202 can dynamically link groups of users or a single user with a group of users. For example, there are six users interacting within the surface computing environment. Three of the users are working on a common topic and two of the other users are working on a different topic. If the two users decide to join the other three users on the common topic, synchronization component 202 can allow those two users to join the other users. The request to join together can be in the form of a gesture or another type of indication that is understandable to synchronization component 202. For example, according to some aspects, the request to join together can be indicated when the topics that the two sets of users are working on merge or join into a common path, which can be dynamically detected by synchronization component 202, which automatically merges the groups of users.

In accordance with some aspects, synchronization component 202 can be configured to group two or more users and the information with which those users are interacting in the surface computing environment in order to protect the information. For example, the group of users can specify that they do not want other users to interact with the information. Based on this grouping, other users that are interacting with the system 200 are limited (or restricted from) using the information associated with the group of users. In such a manner, the other users do not have access to the information shared by the group of users. According to some aspects, if a user that is not included in the group attempts to interact with the protected information, synchronization component 202 can provide an error message to that user and/or to all users, including the group of users.

According to an aspect, the group of users can be provided the opportunity to allow the other user to join the group and interact with the information.

In accordance with some aspects, synchronization component 202 can determine that two or more users have an intent to be grouped together (or be paired) based on the users touching their respective devices together or bringing the devices within very close physical proximity or through other means (e.g., gaze tracking). In such a manner, the action (gesture) of bringing the devices together (or close) together allows synchronization component 202 to define to group the users.

The gesture tracking component 102 can be configured to recognize duplicate action requests from the group of users. For example, a group of users can be identified by synchronization component 202 and, based on this identification, gesture tracking component 102 can be configured to understand that, at times, both users can request a similar action be performed. For example, both users can be working on a presentation and have slides that will be presented. If the users are discussing a certain slide and changes to that slide, at substantially the same time both users might request that an action be performed to move to that slide. Since the users are grouped, synchronization component 202 and/or gesture tracking component 102 can detect that the gestures are for the same (or a similar) action and can ignore one of the gestures and/or automatically combine the gestures into a single gesture understandable by system 200.

Additionally or alternatively, system 200 can include an interaction component 204 that can be configured to provide information related to how users are interacting within the surface computing environment. Generally, in wireless networks there is no indication of which users are interacting with each other (e.g., which users are talking to each other). Providing this information might be useful to allow others to have various types of information about the users (e.g., user rights, user privileges, user authorization levels, and so forth) that can be presented in a collaboration view format. In order to enable a user to understand the interaction, interaction component 204 can associate users through the use of colors (e.g., similar colors indicate the users and/or user devices are in collaboration with each other), sounds, or another standardize manner of presenting this information.

In accordance with some aspects, the interaction information can be utilized to determine who is in control of the surface computing environment. For example, a person entering a room might desire to quickly determine the person in the room that has administrative level privileges. The user might also be interested to know which people in the room have guest privileges or privileges other than administrative level privileges. Interaction component 204 can visually display this information, based on a request for the information, to allow users to determine by some visual metaphor or color the users that are communicating with each other and the privileges to which each user is entitled.

Figure 3:
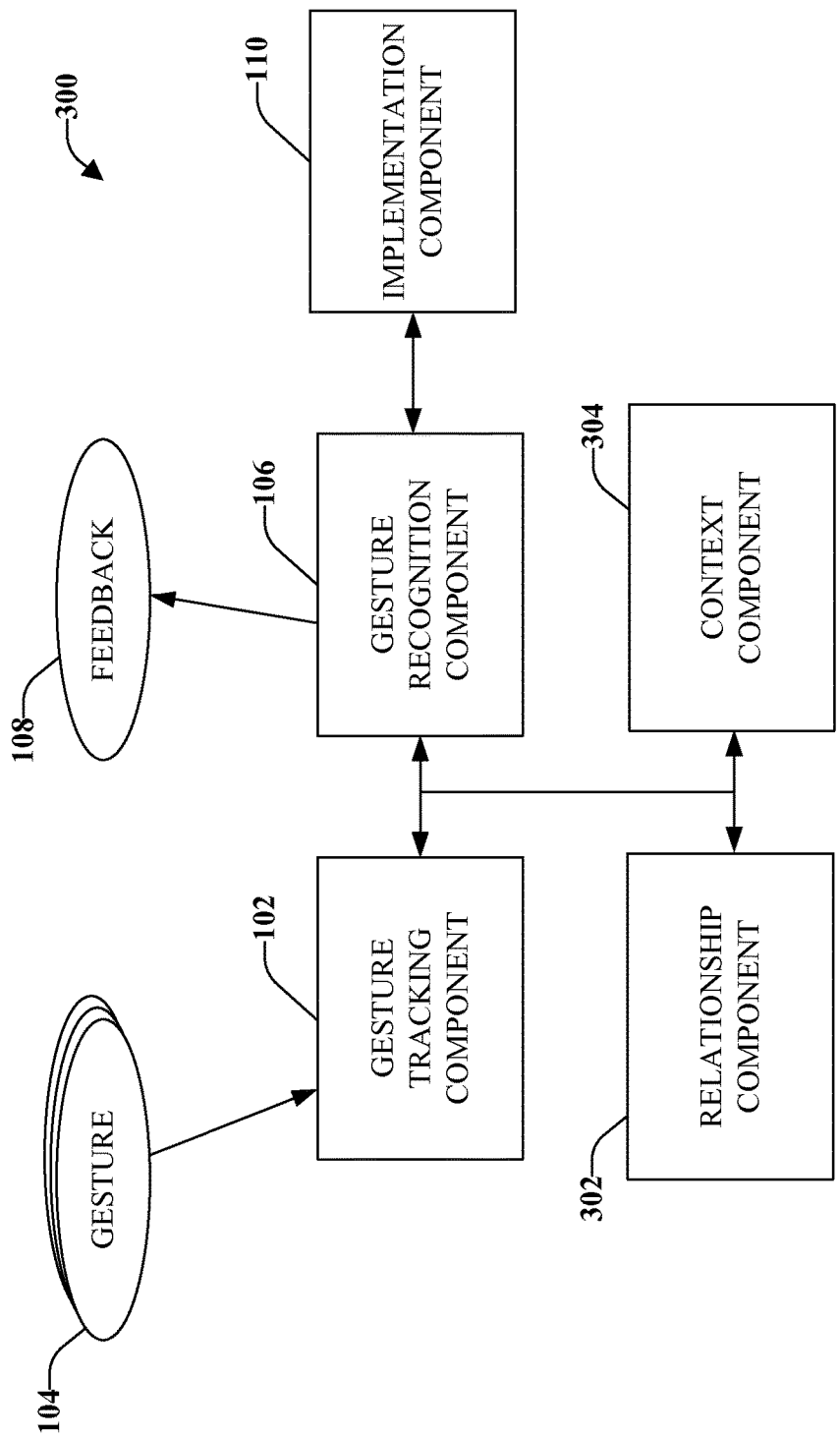
FIG. 3 illustrates a system that recognizes relationships and automatically allows communication of information based on the relationship information, according to an aspect.

FIG. 3 illustrates a system 300 that recognizes relationships and automatically allows communication of information based on the relationship information, according to an aspect. System 300 is similar to the previous systems and includes a gesture tracking component 102 that receives one or more gestures 104 that can indicate a desired action. In accordance with some aspects, the gesture(s) 104 can cause system 300 to implement an action as a direct consequence of receiving a gesture 104, although the user did not explicitly request the action. According to some aspects, the gesture(s) 104 can provide information to various components (e.g., synchronization component, relationship component, context component, and so forth).

A gesture recognition component 106 can provide feedback 108 related to the gesture 104 so that the user knows that the system 300 received the request. After confirmation of the action (or automatically after detection of the gesture) implementation component 110 can cause an action to be performed.

A relationship component 302 is configured to allow two or more users to interact based on a prior history between the users. Relationship component 302 can provide authentication of a user with system 300 or with another user. Thus, relationship component 302 can act as a bridge between two private parties (e.g., users), in a public workspace, and/or in a broader environment beyond a surface and into the environment itself.

Relationship component 302 can allow each user to utilize their private mobile device as a means for allowing that user to interact with the surface computing environment. In such a manner, the users can carry their relationships or historical information around with them. Thus, if two users that have historical information between them (e.g., friends, family members, co-workers, and so forth) meet in a coffee shop, based on the historical information their devices can automatically start communicating information in a private fashion. However, if a third party, who does not have a history with at least one of the users, is to join the communication, relationship component 302 can automatically change one or more parameters based on the third party interaction. For example, system 300 can prompt one of the two users that have the established relationship and ask if the information being displayed should be closed (e.g., private) so that others cannot perceive the information.

In another example, a history can be established between users based on the fact that the users are (and intended to be) in close proximity. To facilitate this, relationship component 302 can access each user's calendar and determine that the users have a meeting or conference together. In accordance with some aspects, relationship component 302 can review historical information and social network relationships and have people specify sharing among devices based upon the social network.

Relationship component 302 can selectively allow users to join a group (which can be managed by synchronization component 202 or another component). For example, if User A is in a restaurant and has a certain set of privileges (e.g., can access personal documents), though interaction with relationship component 302, User A can extend those privileges to User B (or other users). Thus, User A can extend his privileges by gesturing to indicate that the other user (e.g., User B) should be included in User A's privileges bubble (e.g., personal documents). Thus, a simple invitation through the form of a gesture can provide a certain level of privileges, even in the absence of a historical relationship.

Further, relationship component 302 can allow the relationship or privileges to be severed at any time. To enable this, the user that allowed the relationship or the set of privileges can indicate though a gesture that that relationship and/or privileges should be revoked, such as at the end of a meeting or based on other form of interaction (e.g., user walking away from each other). Based on this revocation, relationship component 302 disables the automatic relationship.

Additionally or alternatively, system 300 includes a context component 304 that is configured to define or selectively alter a gesture set based on a common (or uncommon) language, culture, location, or combinations thereof. For example, if a person is in a particular surface computing work space, some activities are more common in that surface computing work space than if the user were in another setting (e.g., another surface computing work space).

In an example, a user might perform certain repetitive tasks when that user is in their office. However, if that user is in a different place, such as a different building, that user might interact differently with the surface computing work space due to different equipment, different people, and so forth.

Context component 304 can also be configured to dynamically adjust and/or train a user in the use of new gestures that are needed for a new setting. For example, when starting at a new organization there might be various tasks that are common to that organization. A new employee might be confused as to those various tasks and/or how to indicate that a task should be performed. Context component 304 can be configured to recognize that the new employee is indicating a particular task and automatically convert the gesture to a common gesture used by others in the organization.

In another example, a person might have just arrived from a different country and would like to interact with system 300. Thus, there might be a set of gestures that the user should learn as she enters that experience for the first time. Context component 304 can be configured to determine that the user is new to the environment and provide some type of training to that user. In accordance with some aspects, context component 304 interacts with the user's mobile device to gain information related to the user. For example, the user's mobile device might have a listing or database of common gestures for that user. Based on this listing, context component 304 can be configured to automatically convert the user's gestures into gestures understandable by system 300 (or gestures common to the local language). Thus, context component 304 can be forgiving and lenient in certain situations and/or based on certain contexts.

Additionally or alternatively, context component 304 can be configured to understand each individual and that individual's idiosyncrasies as it relates to gestures. For example, different people might have different sets of gestures but also might have different gestures at different times or different places. If context component 304 does not recognize that the user has transitioned from one gesture set to another gesture set, context component 304 can communicate to gesture tracking component 102 that more information is needed. Gesture tracking component 102 can then prompt the user for more information (e.g., "Did you mean this, or this?").

Figure 4:
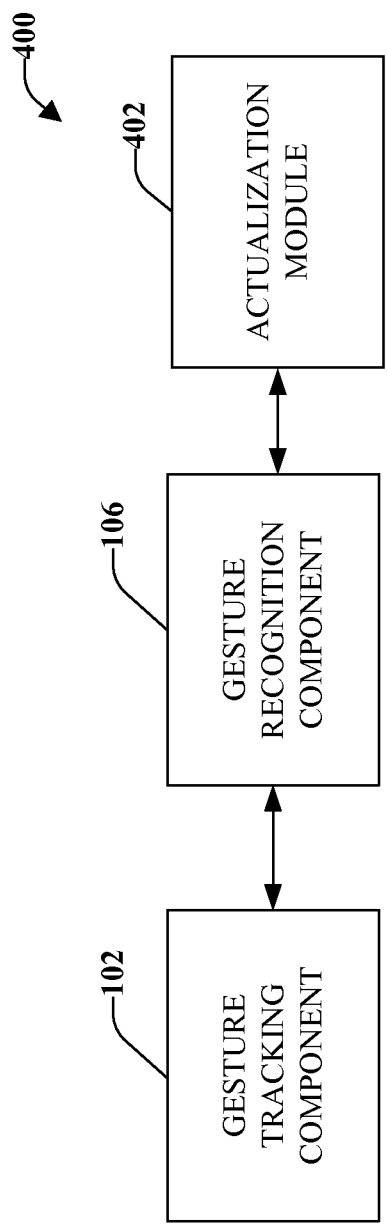
FIG. 4 illustrates a system that employs actualization to portray an inferred action or an automatically implemented action in a more realistic manner, according to an aspect.

FIG. 4 illustrates a system 400 that employs actualization to portray an inferred action or an automatically implemented action in a more realistic manner, according to an aspect. A user provides a gesture that is received by gesture tracking component 102. Based on this request, gesture recognition component 106 can interact with an actualization module 402 that is configured to portray an inferred action in a manner that is readily understandable by the user requesting the action.

For example, there can be a document displayed in a surface computing environment and there is a scroll bar associated with the document (e.g., to allow the user to quickly move around within the document). A user that is a few feet away from the surface places his hand down (or gestures toward) a dark region of the display and indicates a scrolling gesture. Actualization module 402 can echo back the inferred intent (which might not be correct) by providing an image of a transparent hand on the scroll bar. This is a simple means by which system 400 can indicate the action that system 400 infers the user would like performed and it is a more precise way of conveying the system 400 inference to the user.

In accordance with some aspects, actualization module 402 can be configured to provide training to a user that might not be familiar with a certain application or functions that can be performed within the surface computing environment. For example, a transparent hand (or other object) can appear at substantially the same time as the user is performing an action with her hand. In such a manner if the user performs an action (e.g., gesture) that is incorrect, actualization module 402 can provide a visualization of what that gesture should be in order to perform the action (or request the action) correctly. The gesture provided by actualization module 402 can be based on gestures that are similar to the gesture provided by the user.

In accordance with some aspects, actualization module 402 can interact with one or more users, wherein system 400 is functioning in a manner similar to the manner that a human would function. System 400 can collaborate with the one or more users by actualization module 402 providing an automatically implemented action. For example, two users might desire to play a card game that requires four users. In order to allow the users to play the game (without needing to search for other players), system 400 can provide virtual players. However, in order to make the situation more real or believable in the surface computing environment, actualization module 402 exposes "hands" that can provide an experience of interacting with other humans, rather than a computer interaction. In such a manner, system 400 can represent a human and can provide a feeling of interacting with a human.

In another example, a user can play a chess game in the surface computing environment against system 400. In order to allow the user to easily view the moves that system 400 is making with the game pieces, a virtual hand can be rendered by actualization module 402. This can allow the user to perceive the hand moving toward the game piece, the hand picking up the game piece, and then moving the game piece to the new location. This can be especially useful in situations where the user is not familiar with the game (or other application and/or feature) and, thus, allows the user time to understand what is being done (e.g., allows the user time to process the information).

Figure 5:
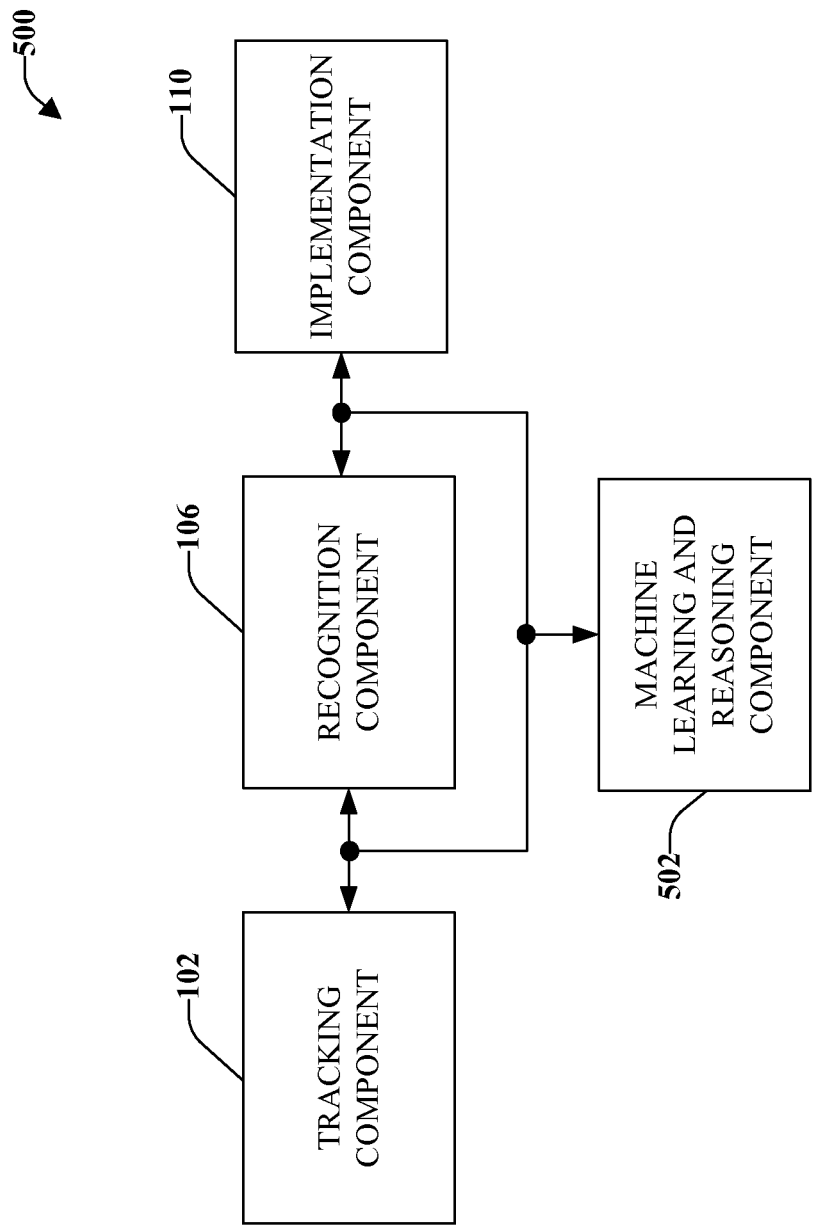
FIG. 5 illustrates a system that employs machine learning and reasoning to automate one or more features in accordance with the disclosed aspects.

FIG. 5 illustrates a system 500 that employs machine learning and reasoning to automate one or more features in accordance with the disclosed aspects. Included in system 500 is a tracking component 102 that recognizes at least one gesture and distinguishes that gesture from one or more common gestures (e.g., using hands while talking, waving "hi" to someone, and so forth). A recognition component 106 is configured to provide an indication that the gesture is recognized (e.g., that system 500 received the gesture and can interpret the gesture). Also included in system 500 is an implementation component 110 that executes an action automatically or after confirmation of an interpretation of the received gesture.

A machine learning component 502 can employ various machine learning techniques to automate one or more features. The machine learning and reasoning component 502 can employ principles of probabilistic and decision theoretic inference and rely on predictive models constructed through the use of machine learning procedures. Logic-centric inference can also be employed separately or in conjunction with probabilistic methods. The machine learning and reasoning component 502 can infer intention of gestures by obtaining knowledge about the possible actions and knowledge about what is being displayed to the user based on the application, the application context, the user context, or combinations thereof. Based on this knowledge, the machine learning and reasoning component 502 can make an inference based on how users interact with content, make gestures with hands, or combinations thereof. Based on these gestures, comments, and so forth, the machine learning and reasoning component 502 can infer what is likely meant based on content that is being displayed in the application context.

If the machine learning and reasoning component 502 has uncertainty related to the intent, the machine learning and reasoning component 502 can automatically engage in a short (or long) dialogue or interaction with the user (e.g., "What do you mean?"). In accordance with some aspects, machine learning component 502 engages in the dialogue with the user through another system component. Computations of the value of information can be employed to drive the asking of questions.

According to some aspects, one user might use a subset of gestures more often then another user. There can be a large set of similar gestures that indicate a probability that these gestures in any form mean a similar action. Machine learning component 502 can make an inference based on the probability that a particular user will use a particular type of gesture (e.g., this user has historically meant for that gesture to enable this action). If there is uncertainty, a prompt can be sent to the user for confirmation. There can be an inference based on a user, based on a group, or based on commonality. For example, the user wants to throw a display somewhere (e.g., put the information being displayed in a different location within the surface computing environment). The standard notion can be that if there are two displays that the user may have meant, both displays blink in sequence. The user can then select the correct display.

In another example, the machine learning and reasoning component 502 detects a scrollable document on a surface unit and the user puts her hands not on the actual scroll bar or not on the actual textual document but makes a scrolling like gesture somewhere else on the display. If nothing else is displayed in the same general area, it can be inferred to mean to scroll the document in the direction of the gesture.

The various aspects (e.g., in connection with receiving a gesture, determining the meaning of the gesture, distinguishing a gesture request from other gestures, implementation, and so forth) can employ various artificial intelligence-based schemes for carrying out various aspects thereof. For example, a process for determining if a particular gesture is a request for an action to be performed or a general gesture (e.g., a person using their hands were talking) can be enabled through an automatic classifier system and process.

A classifier is a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. In the case of gestures, for example, attributes can be common gestures, a combination of gestures, a pattern of gestures, and the classes are applications or functions being utilized in the surface computing environment.

A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, for example, naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated from the subject specification, the one or more aspects can employ classifiers that are explicitly trained (e.g., through a generic training data) as well as implicitly trained (e.g., by observing user behavior, receiving extrinsic information). For example, SVM's are configured through a learning or training phase within a classifier constructor and feature selection module. Thus, the classifier(s) can be used to automatically learn and perform a number of functions, including but not limited to determining according to a predetermined criteria when to implement an action, which action to implement, what users to group together, relationships between users, and so forth. The criteria can include, but is not limited to, similar gestures, historical information, and so forth.

Additionally or alternatively, an implementation scheme (e.g., rule) can be applied to control and/or regulate gestures, inclusion of a group of users, privileges, and so forth. It will be appreciated that the rules-based implementation can automatically and/or dynamically interpret a gesture based upon a predefined criterion. In response thereto, the rule-based implementation can automatically interpret and carry out functions associated with that gesture by employing a predefined and/or programmed rule(s) based upon any desired criteria.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
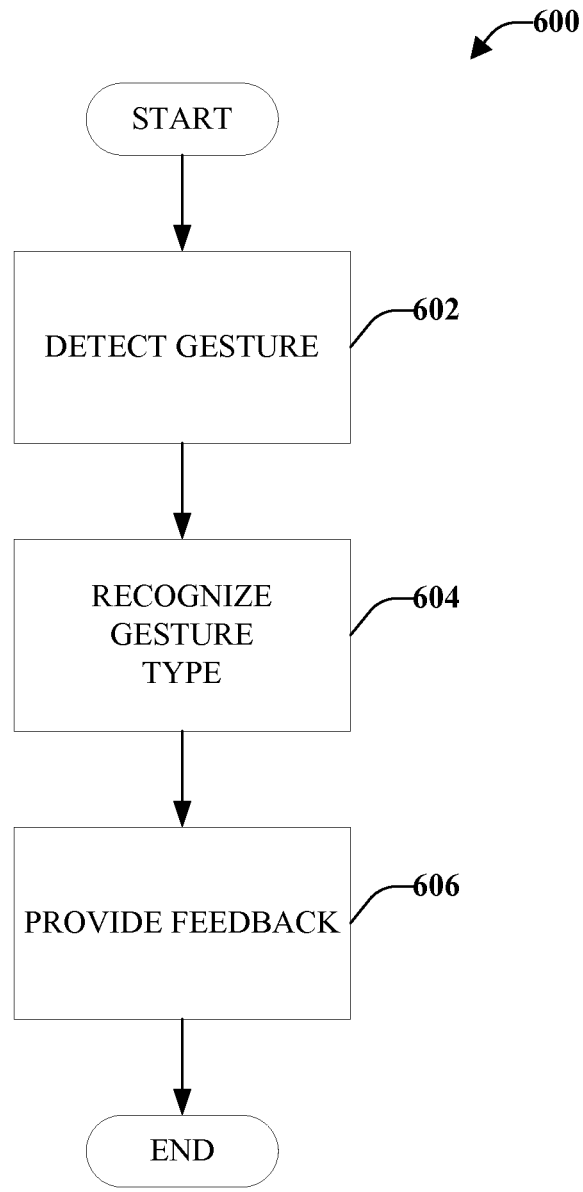
FIG. 6 illustrates a method for automatic execution of actions based on a received gesture in accordance with the various aspects presented herein.

FIG. 6 illustrates a method 600 for automatic execution of actions based on a received gesture in accordance with the various aspects presented herein. Method 600 starts, at 602, when a gesture is detected within a surface computing environment. The detected gesture can be a request to implement an action, a duplicate request, or an undefined gesture. For example, the request to implement an action can be an action that is be performed within a surface computing environment (e.g., print a document, display a picture, move to next presentation slide, and so forth). The duplicate request can be a request by two or more associated (e.g., grouped) users, wherein the request is to perform a common action. The undefined gesture can be a gesture that is not related to implementing an action. For example, a user can gesture while talking but does not intend for that gesture to by interpreted as a request for implementation of an action.

At 604, the gesture is ascertained or recognized that the gesture is for automatic implementation of an action (not a duplicate gesture, not an undefined gesture, or not a common gesture (e.g., using hands while talking)). Duplicate gestures, undefined gestures, and/or common gestures can be selectively ignored. In accordance with some aspects, the gesture can be defined as a function of a user context, an environment context, or combinations thereof.

Feedback related to the gesture is provided, at 606, to indicate that the gesture was detected. The feedback can be a request for further information if the action requested by the user is ambiguous (e.g., can be interpreted more than one way). In accordance with some aspects, the feedback is an automatic implementation of the action (e.g., the user can perceive the action being performed and knows that the action is in response to the request).

According to an aspect, the feedback can be provided as a perceptual representation that mimics the gesture. For example, the perceivable mimicking of the detected gesture can be portrayed as a virtual hand that imitates the motion of the user's hand while the user is performing the gesture. According to some aspects, the motion can be imitated at substantially the same time as the user is making the motion (e.g., virtually mirroring the user's actual movement).

In accordance with some aspects, the feedback can indicate that the gesture is being ignored (e.g., a red light can be displayed indicating that a gesture is ignored and a green light indicates that the gesture has been interpreted).

Figure 7:
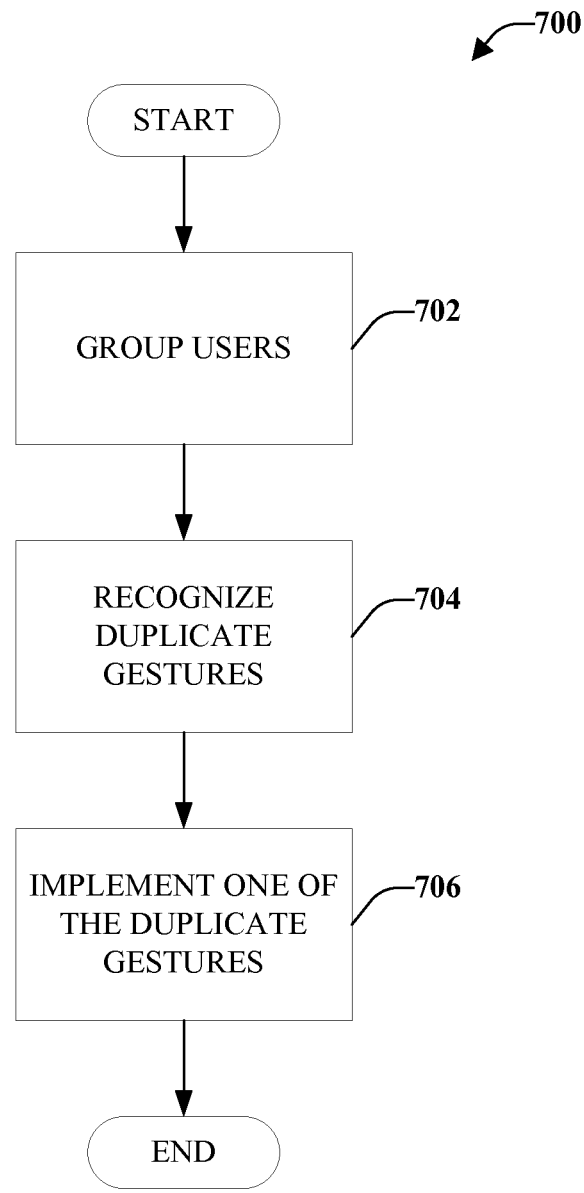
FIG. 7 illustrates a method for selectively ignoring a gesture, according to an aspect.

According to some aspects, inferred intentions and goals based on context, history, affordances, and objects are employed to interpret gestures. An action can be implemented based on the interpretation. If there is uncertainty in intention of one or more gestures for a single device or across multiple devices, independent or coordinated communication of uncertainty or engagement of users through signaling and/or information gathering can occur. Thus, method 600 can ascertain there is uncertainty related to an interpretation of the gesture and can gather information from one or more users to clarify the gesture interpretation FIG. 7 illustrates a method 700 for selectively ignoring a gesture, according to an aspect. Method 700 starts, at 702, when two or more users in a surface computing environment are grouped. The grouping can be made based on a similar task, a similar function, a similar purpose, or combinations thereof. In accordance with some aspects, the grouping can be a function of a historical interaction, a similar task (e.g., a meeting), gaze tracking, or combinations thereof.

At 704, duplication gestures from two or more of users in the group are recognized. This recognition can be a function of the grouping and the similarity of the gestures in movement and time (e.g., two grouped users make substantially the same gesture at substantially the same time).

A requested action associated with one of the duplicate gestures is implemented, at 706. The other (duplicate) gestures are selectively ignored. If there is disparately or confusion related to the similar gesture (e.g., one user gestures to scroll up and the other user gestures to scroll down), the users can be presented with a query or prompt for further information related to a detected gestures.

In accordance with some aspects, method 700 can relay information related to user interactions within the surface computing environment. The information conveyed can include which users are interacting, which devices are interacting, and so forth.

Figure 8:
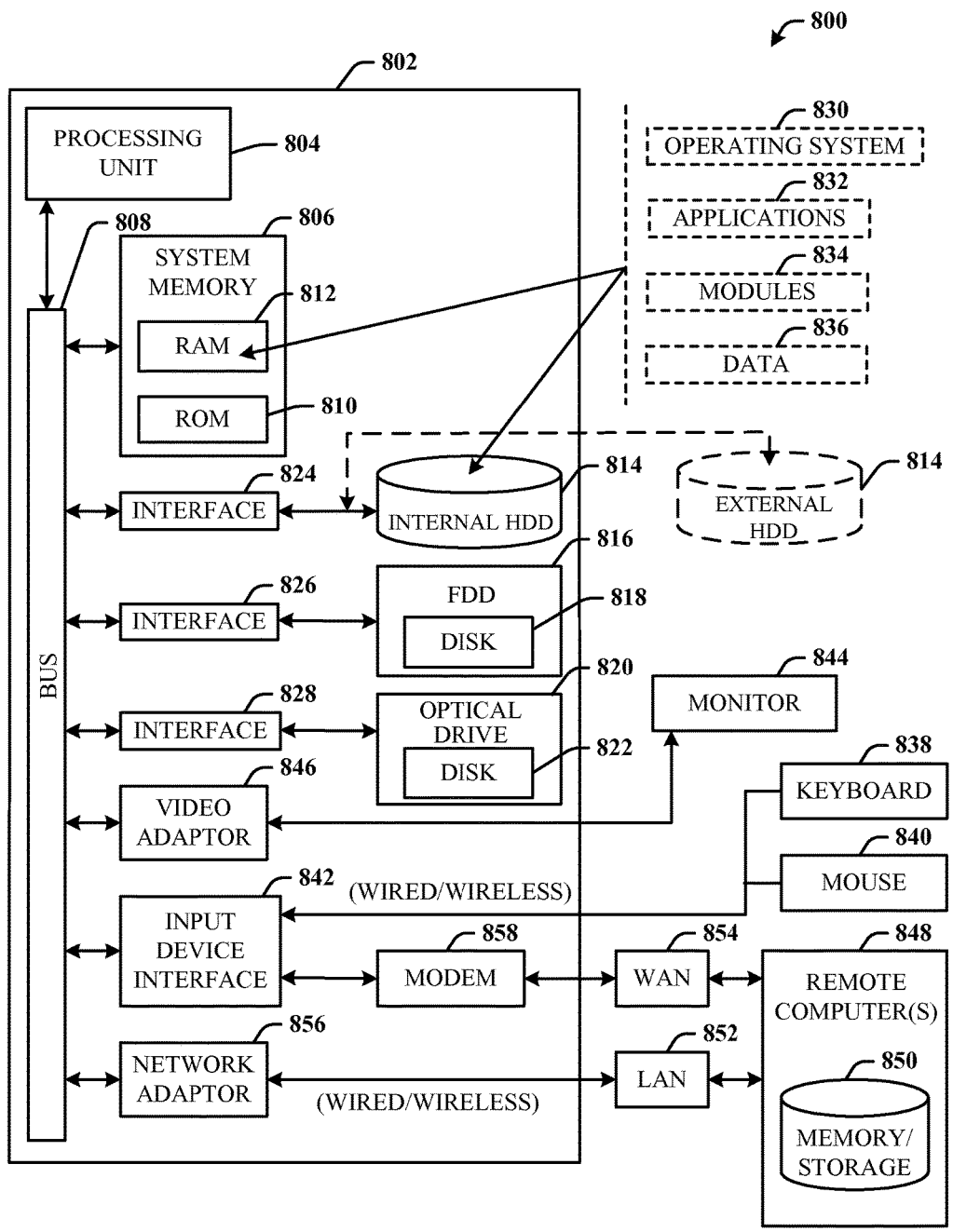
FIG. 8 illustrates a block diagram of a computer operable to execute the disclosed aspects.

Referring now to FIG. 8, there is illustrated a block diagram of a computer operable to execute the disclosed aspects. In order to provide additional context for various aspects disclosed herein, FIG. 8 and the following discussion are intended to provide a brief, general description of a suitable computing environment 800 in which the various aspects can be implemented. While the one or more aspects have been described above in the general context of computer-executable instructions that may run on one or more computers, those skilled in the art will recognize that the various aspects also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 8, the exemplary environment 800 for implementing various aspects includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a non-volatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies. Other external drive connection technologies are within contemplation of the one or more aspects.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 812, including an operating system 830, one or more application programs 832, other program modules 834 and program data 836. All or portions of the operating system, applications, modules, and/or data can also be cached in the RAM 812. It is appreciated that the various aspects can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 through an interface, such as a video adapter 846. In addition to the monitor 844, a computer typically includes other peripheral output devices (not shown), such as speakers, printers, etc.

The computer 802 may operate in a networked environment using logical connections through wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

When used in a LAN networking environment, the computer 802 is connected to the local network 852 through a wired and/or wireless communication network interface or adapter 856. The adaptor 856 may facilitate wired or wireless communication to the LAN 852, which may also include a wireless access point disposed thereon for communicating with the wireless adaptor 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 through the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 9:
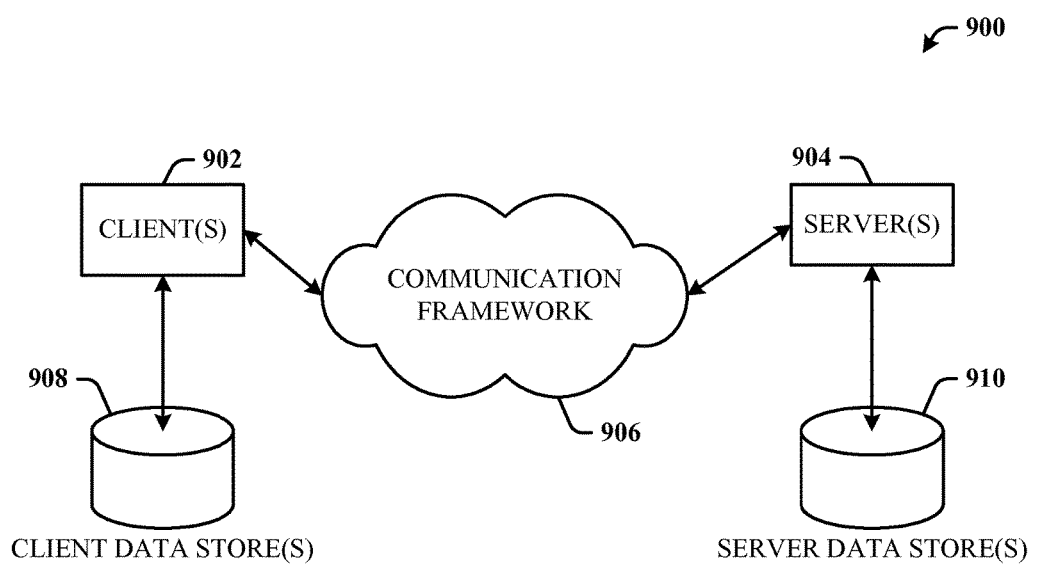
FIG. 9 illustrates a schematic block diagram of an exemplary computing environment in accordance with the various aspects.

Referring now to FIG. 9, there is illustrated a schematic block diagram of an exemplary computing environment 900 in accordance with the various aspects. The system 900 includes one or more client(s) 902. The client(s) 902 can be hardware and/or software (e.g., threads, processes, computing devices). The client(s) 902 can house cookie(s) and/or associated contextual information by employing the various aspects, for example.

The system 900 also includes one or more server(s) 904. The server(s) 904 can also be hardware and/or software (e.g., threads, processes, computing devices). The servers 904 can house threads to perform transformations by employing the various aspects, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated through a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising."

The term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the one or more aspects may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

What is claimed is:

1. A method performed by one or more processors that are configured with executable instructions, the method comprising:
   receiving, by a first computing device, a first gesture input from a touch-sensitive input device;
   determining whether the first gesture input is an undefined gesture that is absent from a first set of gestures stored by the first computing device;
   communicating, over a network, with a second computing device of a user to obtain a second set of gestures of the user stored by the second computing device, the second set of gestures including a plurality of gestures defined by the user, each gesture of the second set of gestures associated with a particular command;
   automatically converting the second set of gestures into gestures to be used on the first computing device;
   determining whether the first gesture input is a gesture included in the automatically converted second set of gestures;
   determining a command associated with the first gesture input based on a gesture of the automatically converted second set of gestures when the first gesture input is determined to be a gesture included in the automatically converted second set of gestures; and
   performing the determined command associated with the first gesture input.

2. The method of claim 1, wherein:
   the second computing device comprises a server; and
   the network comprises an Internet.

3. The method of claim 1, further comprising:
   receiving a second gesture input within a predetermined time period after receiving the first gesture input;
   determining whether the second gesture input is a duplicate gesture based on the first gesture input, wherein the first gesture input and the second gesture input are associated with a same software application; and
   ignoring the duplicate gesture when the second gesture input is determined to be the duplicate gesture.

4. The method of claim 1, further comprising:
   determining whether a second gesture input is included in the first set of gestures;
   determining a second command corresponding to the second gesture input based on the first set of gestures or the automatically converted second set of gestures; and
   performing the determined second command corresponding to the second gesture input.

5. The method of claim 1, further comprising:
   determining whether a second gesture is absent from the first set of gestures; and
   displaying a prompt to select a second command to be associated with the second gesture when the second gesture is absent from the first set of gestures;
   receiving selection of the second command; and
   associating the selected second command with the second gesture.

6. A first computing device comprising:
   an input device;
   one or more processors;
   one or more memory devices to store instructions that are executable by the one or more processors to perform operations comprising:
      receiving a first gesture input from the input device;
      determining whether the first gesture input is absent from a first set of gestures stored in the one or more memory devices;
      communicating, over a network, with a second computing device of a user to obtain a second set of gestures of the user stored by the second computing device, the second set of gestures including a plurality of gestures defined by the user, each gesture of the second set of gestures associated with a particular command;
      automatically converting the second set of gestures into gestures to be used on the first computing device;
      identifying a first command associated with the first gesture input based on a gesture of the automatically converted second set of gestures; and
      sending the identified first command to a software application.

7. The first computing device of claim 6, wherein the second computing device comprises a server.

8. The first computing device of claim 6, wherein the network comprises an Internet.

9. The first computing device of claim 6, wherein the operations further comprise:
   receiving a second gesture input;
   determining whether the second gesture input is included in the first set of gestures;
   determining a second command is associated with the second gesture input based on a gesture of the first set of gestures when the second gesture input is included in the first set of gestures; and
   performing the determine second command associated with the second gesture input.

10. The first computing device of claim 6, wherein communicating, over the network, with the second computing device of the user to obtain the second set of gestures of the user stored by the second computing device comprises:
- sending a request, over the network, from the first computing device to the second computing device to provide the second set of gestures; and
- receiving, over the network, the second set of gestures from the second computing device.

11. The first computing device of claim 6, wherein the operations further comprise:
- receiving a second gesture input;
- determining whether the second gesture input is absent from the first set of gestures;
- receiving user input selecting a second command to be associated with the second gesture input when the second gesture is absent from the first set of gestures; and
- associating the selected second command with the second gesture input.

12. The first computing device of claim 6, wherein the operations further comprise:
- tracking a gaze of the user that is using the first computing device; and
- identifying, based on the gaze of the user, an item displayed on a display device, wherein sending the identified first command to the software application causes the software application to perform the identified first command on the item displayed on the display device.

13. A method comprising:
- receiving, by a first computing device, a first gesture input from an input device associated with the first computing device;
- determining whether the first gesture input is absent from a first set of gestures stored on the first computing device;
- communicating, over a network, with a second computing device of a user to obtain a second set of gestures of the user stored by the second computing device, the second set of gestures including a plurality of gestures defined by the user, each gesture of the second set of gestures associated with a particular command;
- automatically converting the second set of gestures into gestures to be used on the first computing device;
- determining whether the first gesture input is a gesture included in the automatically converted second set of gestures;
- determining a first command associated with the first gesture input based on a gesture of the automatically converted second set of gestures when the first gesture input is determined to be a gesture included in the automatically converted second set of gestures;
- performing the determined first command associated with the first gesture input;
- receiving a second gesture input from the input device within a predetermined time period from receiving the first gesture input;
- determining whether the second gesture input is a duplicate gesture based on the first gesture input, wherein the first gesture input and the second gesture input are associated with a same software application executing on the first computing device; and
- ignoring the second gesture input when the second gesture input is determined to be the duplicate gesture.

14. The method of claim 13, wherein:
- the second computing device comprises a server; and
- the network comprises an Internet.

15. The method of claim 13, wherein communicating, over the network, with the second computing device of the user to obtain the second set of gestures of the user stored by the second computing device comprises:
- sending a request, over the network, to the second computing device to provide the second set of gestures; and
- receiving the second set of gestures from the second computing device over the network.

16. The method of claim 13, further comprising:
- receiving a third gesture input;
- determining whether the third gesture input is included in at least one of the first set of gestures or the automatically converted second set of gestures;
- determining a third command associated with the third gesture input based on a gesture of the at least one of the first set of gestures or the automatically converted second set of gestures when the third gesture input is determined to be included in the at least one of the first set of gestures or the automatically converted second set of gestures; and
- performing the determined third command associated with the third gesture input.

17. The method of claim 13, further comprising:
- receiving a third gesture input;
- determining whether the third gesture input is absent from both the first set of gestures and the automatically converted second set of gestures;
- receiving user input selecting a third command to be associated with the third gesture input when the third gesture is absent from both the first set of gestures and the automatically converted second set of gestures; and
- associating the selected third command with the third gesture input.

18. The method of claim 13, further comprising:
- receiving a third gesture input;
- determining whether the third gesture input is absent from both the first set of gestures and the automatically converted second set of gestures;
- receiving, over the network, a third set of gestures from a third computing device when the third gesture input is absent from both the first set of gestures and the automatically converted second set of gestures;
- determining whether the third gesture input is included in the third set of gestures;
- determining a third command associated with the third gesture input based on a gesture of the third set of gestures when the third gesture input is determined to be included in the third set of gestures; and
- performing the determined third command associated with the third gesture input.

19. The method of claim 13, further comprising:
- sending, over the network, the first set of gestures from the first computing device to the second computing device.

* * * * *